United States Patent
Kawafuji et al.

[11] Patent Number: 5,999,536
[45] Date of Patent: Dec. 7, 1999

[54] ROUTER FOR HIGH-SPEED PACKET COMMUNICATION BETWEEN TERMINAL APPARATUSES IN DIFFERENT LANS

[75] Inventors: Mitsuhiro Kawafuji, Kawasaki; Yasuaki Shimizu, Muramatsumachi; Kiyoshi Kitagawa, Koriyama, all of Japan

[73] Assignee: Anritsu Corporation, Tokyo, Japan

[21] Appl. No.: 08/976,875

[22] Filed: Nov. 24, 1997

[30] Foreign Application Priority Data

Nov. 29, 1996 [JP] Japan .................................. 8-334707

[51] Int. Cl.⁶ .................................. H04L 12/66
[52] U.S. Cl. ................................ 370/401; 370/428
[58] Field of Search .................... 370/401, 402, 370/403, 479, 428, 420, 421, 409, 338, 389, 400, 475

[56] References Cited

U.S. PATENT DOCUMENTS

| | | |
|---|---|---|
| 5,426,637 | 6/1995 | Derby . |
| 5,633,865 | 5/1997 | Short . |
| 5,732,071 | 3/1998 | Saito et al. . |
| 5,754,547 | 5/1998 | Nakazawa .............................. 370/401 |
| 5,815,668 | 9/1998 | Hashimoto . |

Primary Examiner—Douglas W. Olms
Assistant Examiner—Kenneth Vanderpuye
Attorney, Agent, or Firm—Frishauf, Holtz, Goodman, Langer & Chick, P.C.

[57] ABSTRACT

In a router having a routing section for performing routing on the basis of a routing table and an ARP (address resolution protocol) table to transmit a received packet to a destination, and adapted to connect a plurality of local area networks (LANs), to realize high-speed routing, the IP addresses and MAC addresses of the terminal apparatuses in the LANs directly connected to the router are stored in a memory table in correspondence with the interfaces information to which the LANs are connected, together with the IP addresses of the terminal apparatuses in a LAN connected to the router through another router, the MAC address of another router, and the interfaces information to which another router is connected, which are stored in correspondence with each other. When a packet determination section determines that a received packet satisfies predetermined conditions, and a registration determination section determines that destination IP address of the packet is registered in the memory table, a second routing section specially designed for packets satisfying the predetermined conditions reads out information corresponding to the IP address from the memory table, updates the MAC address of the received packet with the information, and outputs the packet.

15 Claims, 9 Drawing Sheets

| IP ADDRESS | MAC ADDRESS | INTERFACE |
|---|---|---|
| 10 . 0. 0. 5 | $T_{11}$ | 1 |
| 20 . 0. 0. 2 | $R_{21}$ | 2 |
| 20 . 0. 0. 5 | $T_{21}$ | 2 |
| 20 . 1. 0. 5 | $T_{31}$ | 3 |
| 192.168.21. 1 | $R_{21}$ | 2 |
| 192.168.21. 5 | $R_{21}$ | 2 |
| 192.168.21.10 | $R_{21}$ | 2 |
| — | — | — |

| IP ADDRESS | MAC ADDRESS | VLANID | PORT NUMBER |
|---|---|---|---|
| 10. 0. 0. 5 | $T_{11}$ | 1 | 1 |
| 20. 0. 0. 2 | $R_{12}$ | 2 | 5 |
| 20. 0. 0. 5 | $T_{21}$ | 2 | 5 |
| 20. 1. 0. 5 | $T_{31}$ | 3 | 12 |
| 192.168.21. 1 | $R_{21}$ | 2 | 5 |
| 192.168.21. 5 | $R_{21}$ | 2 | 5 |
| 192.168.21.10 | $R_{21}$ | 2 | 5 |
| — | — | — | — |

FIG. 6

| DESTINATION | GATEWAY | NET MASK | METRIC | INTER-FACE |
|---|---|---|---|---|
| 10. 0. 0.0 | 0.0.0.0 | 255. 0. 0.0 | 0 | 0 |
| 20. 0. 0.0 | 0.0.0.0 | 255.255. 0.0 | 0 | 1 |
| 20. 1. 0.0 | 0.0.0.0 | 255.255. 0.0 | 0 | 2 |
| 192.168.21.0 | 20.0.0.2 | 255.255.255.0 | 1 | 1 |
| — | — | — | — | — |

FIG. 8A PRIOR ART

| IP ADDRESS | MAC ADDRESS |
|---|---|
| 10. 0. 0. 5 | $T_{11}$ |
| 20. 0. 0. 2 | $R_{21}$ |
| 20. 0. 0. 5 | $T_{21}$ |
| 20. 1. 0. 5 | $T_{31}$ |
| — | — |

FIG. 8B PRIOR ART

ROUTER FOR HIGH-SPEED PACKET COMMUNICATION BETWEEN TERMINAL APPARATUSES IN DIFFERENT LANS

BACKGROUND OF THE INVENTION

The present invention relates to a router serving as an inter-LAN connection apparatus for connecting a plurality of LANs (Local Area Networks) and, more particularly, to a router for high-speed packet communication between terminal apparatuses in different LANs.

As is known, a LAN is used as a communication network for communication between terminal apparatuses in a relatively small-size range such as one company or a limited area.

As a technique of expanding such a network, a technique of connecting different LANs by using inter-LAN connection apparatuses called routers is used.

A router is designed to perform network interconnection by converting the lower three layers of a total of seven layers of a reference OSI (Open System Interconnection) model, i.e., the three layers including the network layer and the subsequent layers. This router updates and outputs the data link layer address of a received packet so as to sequentially cause the address to approach the destination of the packet mainly on the basis of the destination address of the network layer of the received packet. Routing is performed in this manner.

The following description is based on the assumption that an IP (Internet Protocol) is used on the network layer. In addition, addresses on the network layer and the data link layer will be respectively referred to as an IP address and a media access control (MAC) address.

FIG. 7 shows a communication network in which a plurality of LANs 1 to 4 are connected to each other through conventional routers 10 and 10'.

In this case, network addresses are assigned to the LANs 1 to 4 in advance to identify the respective networks.

IP addresses are assigned to terminal apparatuses 1a, . . . 2a, . . . , 3a, . . . , 4a, . . . in the LANs 1 to 4 to identify the respective terminal apparatuses in accordance with the network addresses of the LANs to which the terminal apparatuses belong.

Each terminal apparatus has a unique MAC address (generally having a six-octet length) registered in the apparatus manufacturing process.

Similar to the terminal apparatuses, IP addresses are assigned to the interfaces of the routers 10 and 10' connected to the LANs 1 to 4 in correspondence with the network addresses of the LANs to which the interfaces are directly connected. In addition, MAC addresses are registered in units of interfaces.

Each of the routers 10 and 10' includes two types of memory tables, i.e., a routing table and an ARP (address resolution protocol) table, to obtain an optimal route through which a packet received from a terminal apparatus in a LAN and addressed to a terminal apparatus in another LAN is to be transmitted to the destination LAN.

FIGS. 8A and 8B respectively show a routing table 11 and an ARP table 12 of the router 10.

In the "DESTINATION" column of the routing table 11 in FIG. 8A, the network addresses of the LANs 1 to 4 which the router 10 can connect are stored.

In the "GATEWAY" column, data "(0.0.0.0)" are stored to indicate that there are no gateways for LANs, of the LANs whose addresses are stored in the "DESTINATION" column, which are directly connected to the router 10, like the LANs 1 to 3.

In the "GATEWAY" column, IP address [20.0.0.2] of the interface of another router 10' with respect to the LAN 2 is stored in correspondence with the LAN 4 which is indirectly connected to the LAN 2 through the router 10'.

In the "NET MASK" column, net mask data (4-octet length) are stored. Each of net mask data is used as a mask value when comparing the destination IP address of the received packet with the "DESTINATION" column of the routing table.

In the "METRIC" column, information about the distance to the LAN to which a terminal apparatus which is to receive a packet belongs (generally the number of routers interposed between the router and the LAN) is stored.

In the "INTERFACE" column, interface numbers indicating the specific interfaces to be used for connection to the respective LANs are stored.

In the ARP table 12 in FIG. 8B, the IP addresses and MAC addresses of the terminal apparatuses in the LANs 1 to 3 directly connected to the router 10 and the interface of another router 10', on the LAN 2 side, which is directly connected to the LAN 2, are stored in correspondence with each other.

Note that the router 10' also includes two types of memory tables similar to those described above.

FIG. 9 is a flow chart showing a procedure for routing performed by the router 10.

For example, an operation to be performed when a packet is to be transmitted from the terminal apparatus 1a in the LAN 1 to the terminal apparatus 4a in the LAN 4 will be described below with reference to the flow chart of FIG. 9.

First of all, the terminal apparatus 1a transmits a packet P1 in FIG. 10A onto the LAN 1.

This packet P1 has a MAC header portion Ha, an IP header portion Hb, and data portions Da and FCS (Frame Check Sequence).

In the MAC header portion Ha, the MAC address ($R_{11}$) of the router 10 to which the packet is directly transmitted is written as a destination MAC address $DA_{MAC}$ (to be simply referred to as $DA_{MAC}$ hereinafter), and the MAC address ($T_{11}$) of the terminal apparatus 1a itself is also written as a source MAC address $SA_{MAC}$ (to be simply referred to as $SA_{MAC}$ hereinafter).

In the IP header portion Hb, IP address [10.0.0.5] of the terminal apparatus 1a itself is written as a source IP address $SA_{IP}$ (to be simply referred to as $SA_{IP}$ hereinafter), and IP address [192.168.21.5] of the terminal apparatus 4a which is to finally receive the packet P1 is written as a destination IP address $DA_{IP}$ (to be simply referred to as $DA_{IP}$ hereinafter).

As shown in FIG. 9, the router 10 receives the packet P1, in which the MAC address ($R_{11}$) of its interface is written as $DA_{MAC}$, on the LAN 1, and calculates the AND of $DA_{IP}$ [192.168.21.5] of the packet P1 and each net mask data of the routing table 11. The router 10 then obtains the AND which coincides the network address in the corresponding row of the "DESTINATION" column (steps S1 to S4).

According to the above table, network address [192.168.21.0] is uniquely determined by the AND of $DA_{IP}$ and net mask data [255.255.255.0] ("255" is 8-bit data consisting of only 1s; "0" is 8-bit data consisting of only 0s) in the fourth row of the table when viewed from the top.

If the ANDs coincide with a plurality of network addresses in the ANDs calculation in step 1 to 4, the router 10 obtains one of the network addresses which has the smallest metric value (steps S5 and S6).

The router 10 then checks the presence/absence of a gateway address corresponding to this network address (step S7).

In this case, since [20.0.0.2] is present as a gateway address, the router 10 reads out the MAC address ($R_{21}$) corresponding to the gateway address from the ARP table 12 (step S8).

If the gateway address corresponding to the obtained network address is (0.0.0.0), the router 10 reads out the MAC address corresponding to $DA_{IP}$ of the packet received on the LAN 1 from the ARP table 12 (step S9).

As shown in FIG. 10B, the router 10 updates $DA_{MAC}$ with the obtained MAC address ($R_{21}$), and outputs a packet P2 whose $SA_{MAC}$ is updated with the MAC address ($R_{13}$) of the interface of the router 10 itself, which is connected to the LAN 2, from the previously obtained interface to the LAN 2 (step S10).

Routing processing similar to the routing processing performed by the router 10 is also performed by the router 10'.

More specifically, the router 10' receives the packet P2 on the LAN 2, and calculates the AND of $DA_{IP}$ [192.168.21.5] of the packet P2 and each mask data of the routing table of the router 10'. With this operation, the router 10' obtains network address [192.168.21.0] of the LAN 4 to which the terminal apparatus 4a belongs, and also obtains the interface to which the LAN 4 is connected. In addition, the router 10' reads out the MAC address ($T_{41}$) corresponding to $DA_{IP}$ [192.168.21.5] from the ARP table, and outputs a packet P3 whose MAC header portion Ha is updated with the readout MAC address ($T_{41}$) and the MAC address ($R_{22}$) of the router 10' to the LAN 4, as shown in FIG. 10C.

The terminal apparatus 4a connected to the LAN 4 receives the packet P3 in which the MAC address ($T_{41}$) of the apparatus itself is written as $DA_{MAC}$ of the MAC header portion.

In this manner, with routing performed by the routers 10 and 10', packets can be reliably exchanged between terminal apparatuses in different LANs.

Note that the IP address of an interface itself may be stored in the "GATEWAY" row of the routing table, instead of (0.0.0.0), to indicate the direct connection of the interface.

In the above conventional router, however, the two types of memory tables (the routing table 11 and the ARP table 12) are referred to twice every time a packet is received, and the routing table 11 is searched for an optimal route in consideration of net mask data and metric values. That is, complicated processing is required. For this reason, software processing is inevitably required, and hence high-speed routing processing cannot be realized.

Although a considerable increase in the data transmission rate in each LAN has recently been attained, the routing speed cannot be increased because the above complicated processing is performed by means of software every time a packet is received. The efficiency of packet transmission to other LANs is therefore very low.

In addition to the scheme of connecting remote LANs to each other, a scheme has recently been realized, in which a plurality of terminal apparatuses connected to the connectors of one switching hub are formed into a plurality of groups to realize VLANs (virtual LANs) in units of groups.

The routers for connecting such VLANs to each other, however, cannot perform high-speed packet transmission even between terminal apparatuses in different VLANs which are located at a short distance from each other.

BRIEF SUMMARY OF THE INVENTION

It is, therefore, an object of the present invention to provide a router serving as an inter-LAN connection. apparatus which can perform high-speed routing based on the assumption that most of the packets flowing in LANs satisfy predetermined conditions.

According to the present invention, there is provided a first router having a routing section for performing routing based on a routing table and an ARP (address resolution protocol) table to transmit a received packet to a destination and adapted to connect a plurality of local area networks (LANs), comprising:

a memory table for storing a MAC (media access control) address and interface information obtained by processing a IP (Internet protocol) address of the destination of the received packet in the first routing section in association with the IP address of the destination; and a processor which obtains a MAC address and interface information corresponding to the IP address by using information in the memory table when the same IP address of the destination as the IP address of the destination stored in the memory table is input after processing by the first routing section.

The processor comprises a registration determination section for checking whether the IP address of the destination of the received packet is stored in the memory table; and a second routing section for outputting the received packet based on the MAC address corresponding to the IP address by using information in the memory table, when the registration determination section determines that the IP address of the destination of the received packet is stored. The first routing section performs routing when the registration determination section determines that the IP address of the destination of the received packet is not stored.

Additional objects and advantages of the invention will be set forth in the description which follows, and in part will be obvious from the description, or may be learned by practice of the invention.

The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6 is a view showing the contents of a memory table in FIG. 2 in a case wherein VLANs are connected to each other through routers according to another embodiment. of the present invention;

FIGS. 8A and 8B are views showing the contents of memory tables used in the conventional routers;

DETAILED DESCRIPTION OF THE INVENTION

Figure 1:
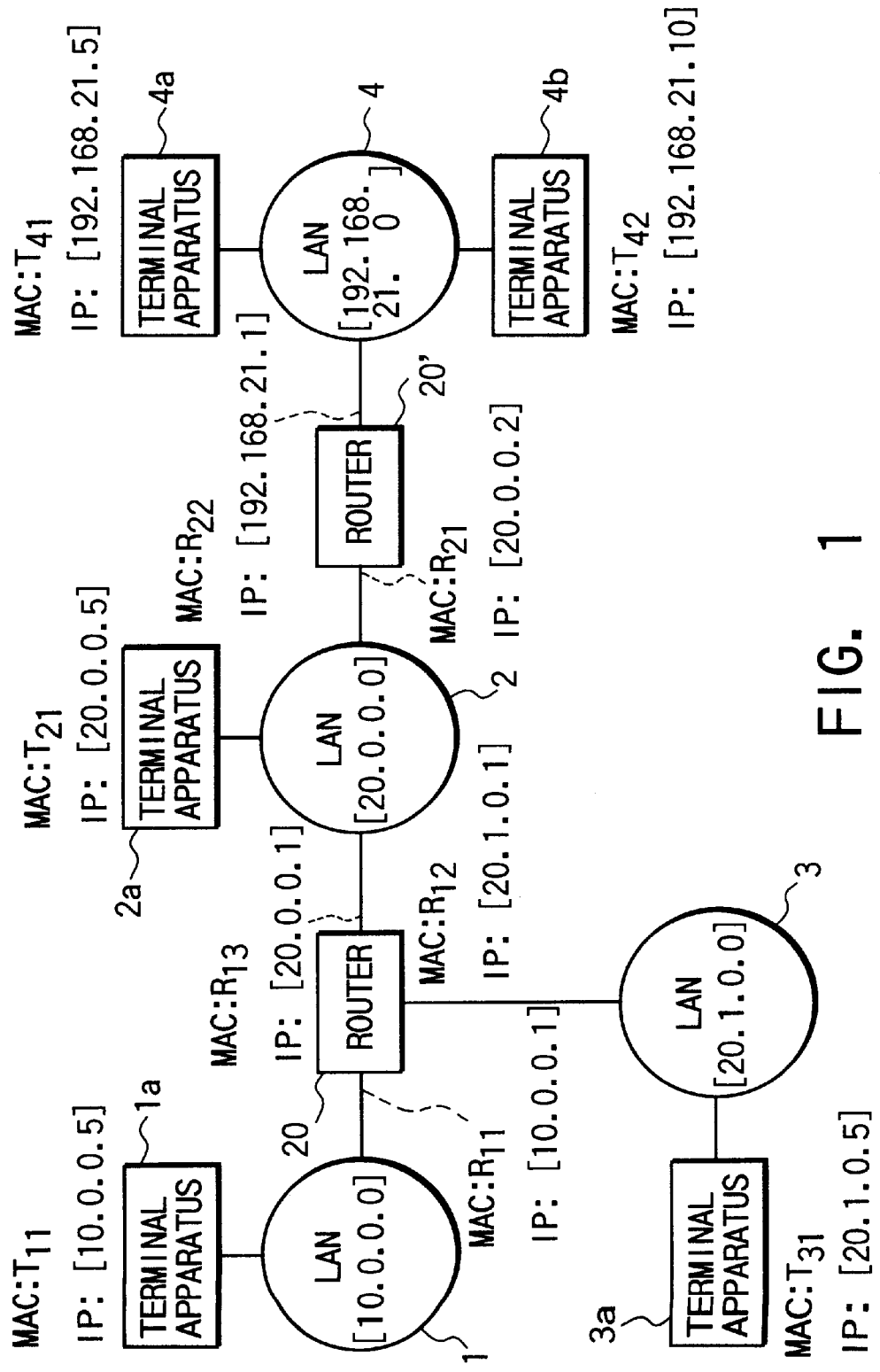
FIG. 1 is a block diagram showing a communication network using routers according to an embodiment of the present invention.

Reference will now be made in detail to the presently preferred embodiments of the invention as illustrated in the accompanying drawings, in which like reference characters designate like or corresponding parts throughout the several drawings.

An outline of the present invention will be described first. According to the present invention, a router 20 serving as an inter-LAN connection apparatus has a plurality of interfaces 21a to 21c for connection to LANs and is designed to update the data link layer address of a packet received through one of the interfaces and output it to the nearest LAN so as to transmit the packet to the LAN to which the terminal apparatus corresponding to the network layer destination address of the packet belongs. To achieve the above object, the router 20 includes a memory table 23 in which the network layer addresses of the respective terminal apparatuses in LANs 1 to 3 directly connected to the above interfaces and the network layer addresses of the respective terminal apparatuses in a LAN 4 connected to the router 20 through another inter-LAN connection apparatus 20' are stored, together with the data link layer addresses of the terminal apparatuses in the LANs directly connected to the above interfaces, which are stored in correspondence with the network layer addresses, the data link layer address of another inter-LAN connection apparatus, which is stored in correspondence with the network layer addresses of the respective terminal apparatuses in the LAN connected to the router 20 through another inter-LAN connection apparatus, and pieces of designation information for designating the interfaces for directly transmitting packets to the terminal apparatuses having the stored data link layer addresses and another inter-LAN connection apparatus, which are stored in correspondence with the respective network layer addresses, a packet determination means 25 for comparing the respective data of the header portion of a received packet with corresponding predetermined values to check whether the received packet satisfies predetermined conditions, a registration determination means 29 for checking whether the network layer destination address of the received packet is registered in the memory table, and a routing section 30 for reading out the data Link layer address corresponding to the destination address and the corresponding interface designation information from the memory table when the packet determination means determines that the received packet satisfies the predetermined conditions, and the registration determination means determines that the network layer destination address is registered in the memory table, updating the data link layer address of the received packet with the readout data link layer address and the data link layer address of the apparatus itself, and outputting the packet from the interface designated by the designation information.

An embodiment of the present invention based on the above outline will be described next with reference to the views of the accompanying drawing.

FIG. 1 shows a communication network in which the LANs 1 to 4 are connected to each other through the routers 20 and 20'.

Figure 2:
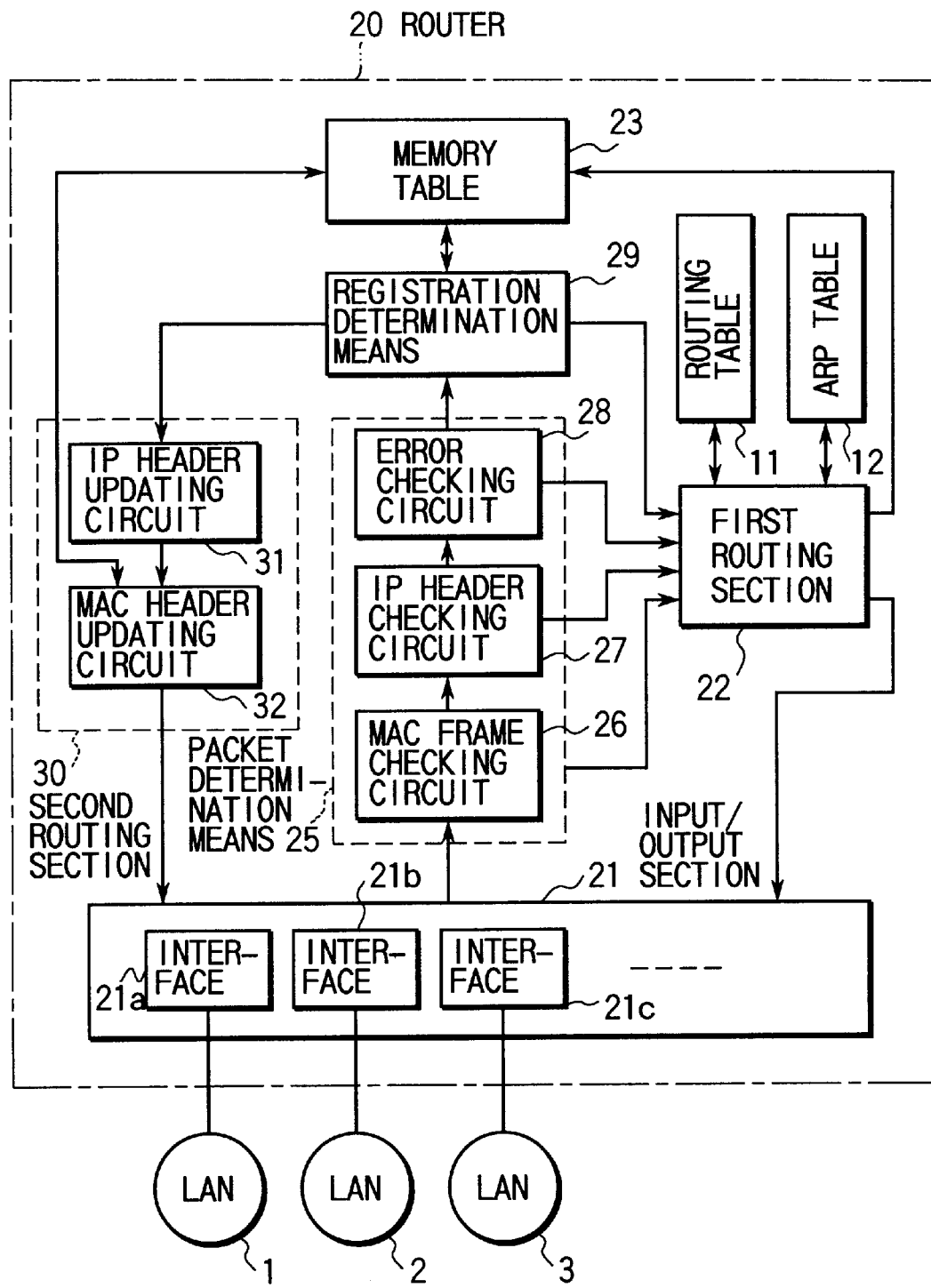
FIG. 2 is a block diagram showing the arrangement of each router according to the embodiment.

FIG. 2 shows the arrangement of the router 20 (20').

Figure 7:
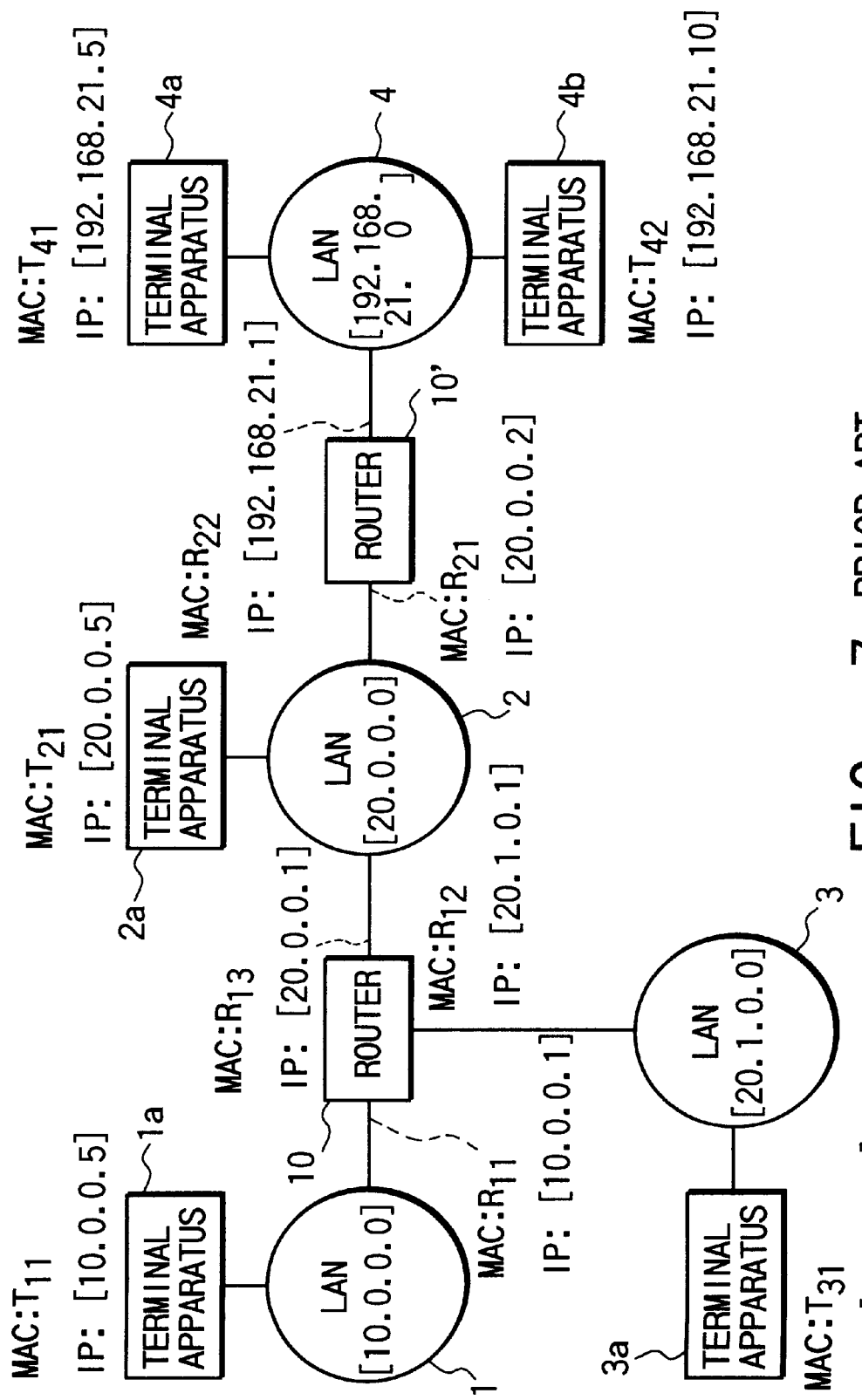
FIG. 7 is a block diagram showing a communication network using conventional routers.
Figure 9:
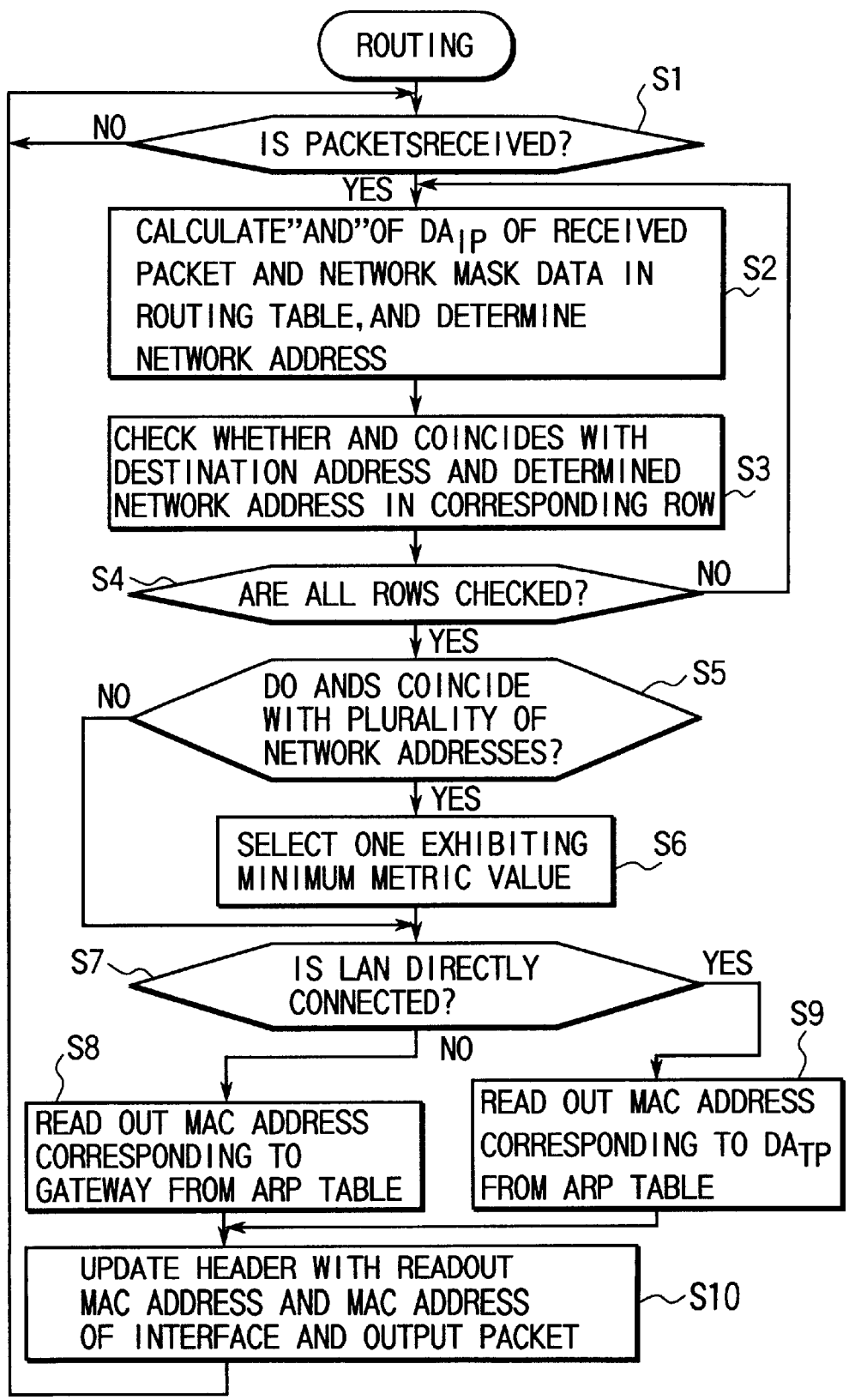
FIG. 9 is a flow chart showing a procedure for processing performed by each conventional router.

In this case, the arrangement of the communication network is the same as the conventional communication network shown in FIG. 7, and the addresses of the LANs 1 to 4 and the routers 20 and 20' are set in the same manner as described above.

As shown in FIG. 2, the router 20 includes an input/output section 21 for connection to the LANs 1 to 3, a routing table 11 and an ARP table 12 like those described above, a first routing section 22 for performing routing in the same manner as in the prior art by using these two memory tables, and forming/managing the memory table 23, the packet determination means 25 for checking whether a packet received through the input/output section 21 satisfies predetermined conditions, the registration determination means 29 for checking whether $DA_{IP}$ of the input packet is registered in the memory table 23, and the second routing section 30 designed for performing routing for only a packet which is determined by the packet determination means 25 as a packet satisfying the predetermined conditions and also determined by the registration determination means 29 as an already registered packet.

The input/output section 21 includes a plurality of interfaces 21a, 21b, 21c, . . . for connection to a plurality of LANs 1, 2, 3, . . . .

The interfaces 21a, 21b, 21c, . . . input packets whose $DA_{MAC}$ data coincide with the MAC addresses of the respective interfaces to the router 20 on the LANs to which the respective interfaces are connected, and output packets having undergone routing in the router 20 to the corresponding LANs 1, 2, 3, . . . .

Figures 3, 4:
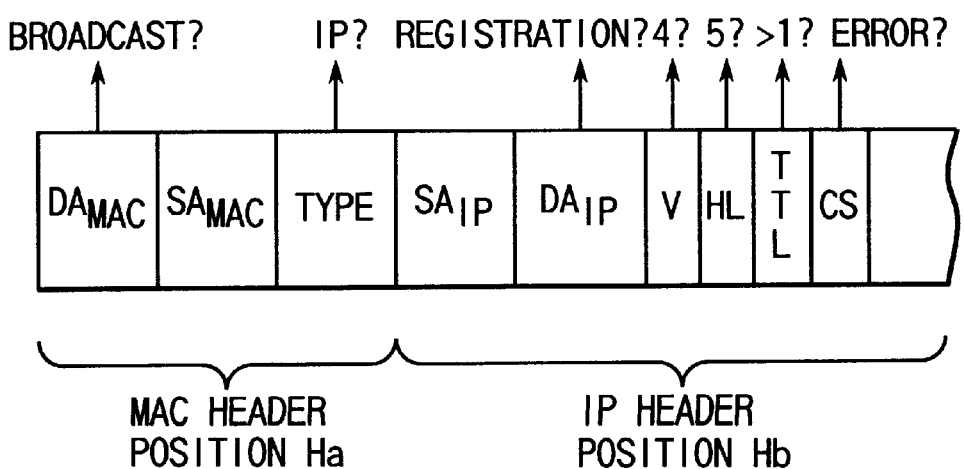
FIG. 3 is a view showing the contents of a memory table in FIG. 2.
FIG. 4 is a view showing the relationship between a packet received in the router according to the embodiment and an object to be determined by a packet determination section.

The first routing section 22 performs routing for the packet input through the input/output section 21 by using the routing table 11 and the ARP table 12 in FIGS. 8A and 8B in the same manner as the conventional router, and also generates data like those stored in the memory table 23 in FIG. 3.

More specifically, the IP addresses of all the terminal apparatuses 1a, . . . , 2a, . . . , 3a, . . . , 4a, . . . , which can be connected through the router 20 and the interface of the router 20' are stored in the "IP ADDRESS" column of the memory table 23 in FIG. 3.

In the "MAC ADDRESS" column, the MAC addresses of terminal apparatuses, of the terminal apparatuses having the IP addresses in the "IP ADDRESS" column, which belong to the LANs directly connected to the interfaces of the router 20 are written, together with the MAC address of the interface of the router 20' on the router 20 side, which is written in correspondence with a terminal apparatus, e.g., the terminal apparatus 4a, in the LAN 4 connected to the interface of the router 20 through another router 20'.

Interface numbers indicating interfaces for transmitting packets to the terminal apparatuses 1a, . . . , 2a, . . . , 3a, . . . , 4a, . . . and the router 20' whose MAC addresses are written in the "MAC ADDRESS" column are written in the "INTERFACE" column.

That is, the optimal routes obtained by the conventional routing scheme executed by the first routing section 22 are registered in the memory table 23 in advance in correspondence with $DA_{IP}$ of received 16 packets.

The packet determination means 25 is constituted by a MAC frame checking circuit 26, an IP header checking circuit 27, and an error checking circuit 28.

The packet determination means 25 checks whether a packet received through the input/output section 21 satisfies the predetermined conditions. As shown in FIG. 4, the packet determination means 25 performs the respective checks by comparing the data of a MAC header portion Ha and an IP header portion Hb of the packet with predetermined data.

The MAC frame checking circuit 26 compares the TYPE information and $DA_{MAC}$ of the MAC header portion of a packet input through the input/output section 21 with predetermined data to check whether the packet complies with the IP of the LAN protocols, and is not a broadcast packet. With these checks, the MAC frame checking circuit 26 outputs packets (e.g., IPX and AppleTalk packets) other than IP packets and broadcast packets to the first routing section 22.

The IP header checking circuit 27 checks a header length HL, version V, and TTL (Time to Live) value of the IP header portion of a packet. With this check, for example, the IP header checking circuit 27 outputs a packet whose header length HL is not "5", a packet whose version V is not "4", and a packet whose TTL value is "1" or less to the first routing section 22.

Note that a TTL value is used to prevent a given packet from entering a loop route in the process of propagation through a route to the final destination terminal apparatus, permanently existing on the network, and interfering with communication of other packets. The TTL value is decreased every time the packet passes through a router. When the TTL value becomes a predetermined value or less, the packet is discarded by the first routing section 22.

The error checking circuit 28 performs an error check on the IP header portion of a packet on the basis of the check sum CS of the IP header portion. If there is an error, the packet is sent to the first routing section 22 to be processed.

The registration determination means 29 checks whether $DA_{IP}$ of a packet which is determined by the packet determination means 25 as a packet satisfying the predetermined conditions is registered in the memory table 23. If $DA_{IP}$ is not registered, the registration determination means 29 outputs the packet to the first routing section 22.

If a packet satisfies the predetermined conditions, i.e., the protocol is an IP, a unicast packet, the header length HL is "5", the version V is "4", the TTL value is "2" or more, and no error is present in the IP header, and $DA_{IP}$ has already been registered in the memory table 23, the second routing section 30 performs routing for the packet on the basis of the memory table 23.

The second routing section 30 has an IP header updating circuit 31 and a MAC header updating circuit 32.

The IP header updating circuit 31 decreases the TTL value Df the IP header portion of the packet satisfying the predetermined conditions by a predetermined value, and updates the check sum CS in accordance with the decrease in the TTL value.

The MAC header updating circuit 32 obtains the MAC address and the interface number which correspond to the $DA_{IP}$ of the packet satisfying the predetermined conditions from the memory table 23, and updates $DA_{MAC}$ of the packet with the obtained MAC address. In addition, the MAC header updating circuit 32 updates $SA_{MAC}$ with the MAC address corresponding to the obtained interface number, and outputs the packet from the corresponding interface.

The respective circuits constituting the packet determination means 25, the registration determination means 29, and the routing section 30 need not execute complicated processing unlike the first routing section 22, and perform only comparison and rewrite operations mainly for data at predetermined bit positions of a packet.

According to the router 20 of the present invention, since these circuits can be simply formed by using dedicated high-speed logic circuits, routing for a packet satisfying the predetermined conditions can be performed at a very high speed.

Note that the router 20' has the same arrangement as that of the router 20 (the contents of the respective memory tables differ).

Figure 5:
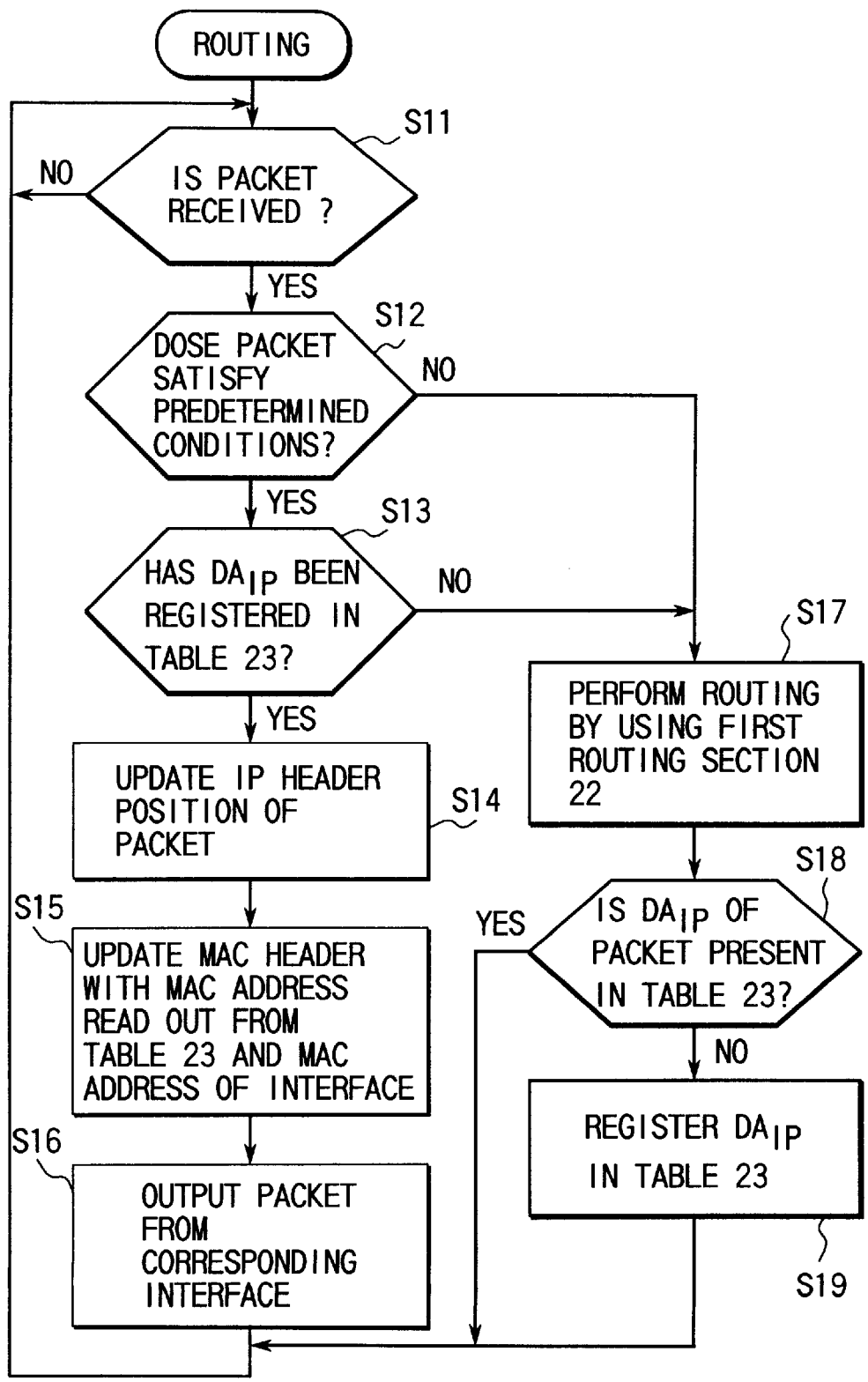
FIG. 5 is a flow chart showing a procedure for processing performed by the router according to the embodiment.

FIG. 5 is a flow chart showing a procedure for processing performed by the router 20 (20').

The operation of the router 20 (20') will be described below with reference to the flow chart of FIG. 5.

Figure 10A:
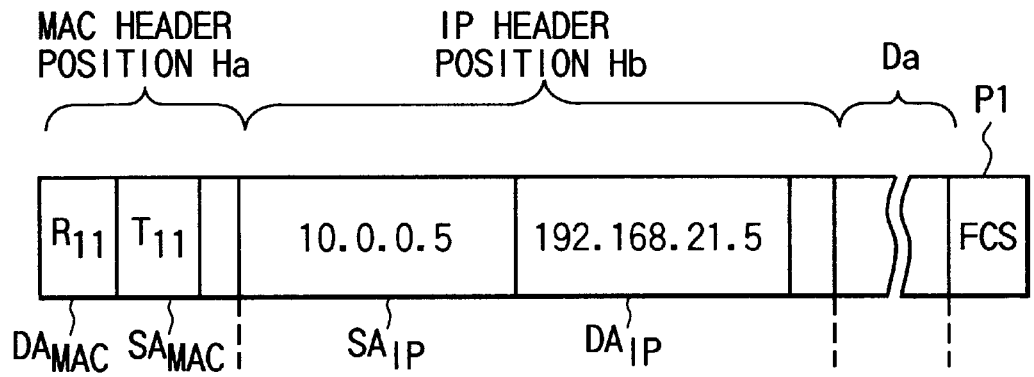
FIGS. 10A to 10C are views showing how a packet output onto a communication network changes.

When, for example, the packet P1 shown in FIG. 10A is output from the terminal apparatus 1a in the LAN 1, the router 20 receives this packet and causes the packet determination means 25 and the registration determination means 29 to check whether the packet satisfies the predetermined conditions and $DA_{IP}$ of the packet has already been registered in the memory table 23 (steps S11 to S13).

If the packet satisfies the predetermined conditions, and $DA_{IP}$ has already been registered, the router 20 causes the routing section 30 to update the TTL value and check sum of the IP header portion of the packet, and reads out, from the memory table 23, the MAC address ($R_{21}$) and the interface number (2) which correspond to $DA_{IP}$ [192.168.21.5] determined by the registration determination means 29 as an already registered address.

Figure 10B:
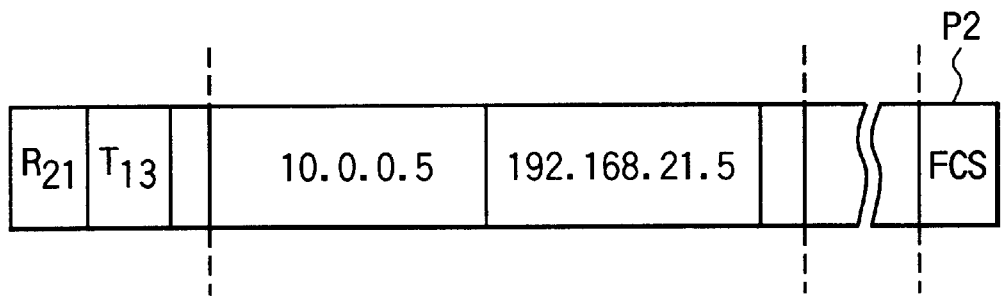

As shown in FIG. 10B, the router 20 outputs a packet P2, whose MAC header portion Ha is updated with the readout MAC address ($R_{21}$) and the MAC address ($R_{12}$) of the interface 21b, from the interface 21b corresponding to number 2 to the LAN 2 (steps S14 to S16).

If it is determined in step S12 that the received packet does not satisfy the predetermined conditions, or $DA_{IP}$ has not been registered in the memory table 23, the router 20 causes the first routing section 22 to perform routing for the packet in the same manner as in the conventional routing scheme (step S17).

In this case, the first routing section 22 updates the routing table 11 and the ARP table 12, as needed, and registers $DA_{IP}$ in the memory table 23 to reconstruct the memory table 23 if it has not been registered (steps S18 and S19).

According to the router 20 of the present invention, therefore, if, for example, $DA_{IP}$ of a received packet has not been registered in the memory table 23, and routing for the packet is performed by the first routing section 22, since the MAC address and the interface number which correspond to $DA_{IP}$ of the packet are registered in the memory table 23, the second routing section 30 can perform high-speed routing for the next packet addressed to the same destination.

The packet P2 output from the router 20 to the LAN 2 is received by the router 20'.

Figure 10C:
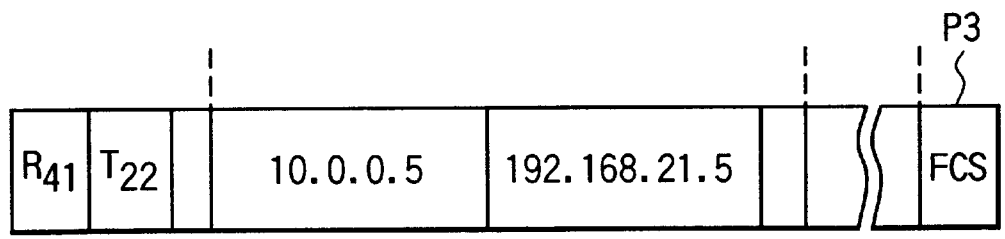

The router 20' performs the same processing as that performed by the router 20 to output a packet P3, whose MAC header portion Ha is updated with the MAC address ($T_{41}$) of the terminal apparatus 4a and the MAC address ($R_{22}$) of the router itself as shown in FIG. 10C, to the LAN 4. As a result, the terminal apparatus 4a receives this packet P3.

As described above, each of the routers 20 and 20' uses the memory table 23, in which the MAC addresses and the interfaces which correspond to the optimal, nearest routes with respect to $DA_{IP}$ of packets are registered in advance, as well as the routing table 11 and the ARP table 12.

In addition, each of the routers 20 and 20' includes the second routing section 30 designed specially for packets satisfying the predetermined conditions, i.e., most of the packets flowing on the LANs.

Each of the routers 20 and 20' of this embodiment can greatly increase the packet transmission efficiency and cope with high-speed LANs as compared with the conventional technique of obtaining optimal routes for all packets by referring to the two types of memory tables, i.e., the routing table 11 and the ARP table 12.

In the above embodiment, the router 20', which is connected to the router 20 through the LAN, has the same arrangement as that of the router 20. However, the router 20' may be a router for performing routing only by means of software as in the prior art.

In the above description, the first routing section 22 performs routing on the basis of the routing table 11 and the ARP table 12. However, a first routing section corresponding to a plurality of types of protocols including the IP may be used.

In the above embodiment, the respective checking circuits 26 to 28 of the packet determination means 25 and the registration determination means 29 are connected in series. These circuits, however, may be connected in parallel in consideration of the differences between the periods of time taken to obtain the respective check and determination results.

For example, the checking circuits 26 to 28 may be arranged such that a MAC frame check and an IP header check, which require only comparison between packet data, are sequentially performed, while an error check requiring calculations is concurrently performed. Alternatively, these circuits may be arranged such that determination of registration with respect to a received packet and packet determination may be concurrently performed regardless of whether the packet satisfies the predetermined conditions.

Assume that the terminal apparatuses connected to a plurality of connection ports of a switching hub are formed into a plurality of groups to construct virtual LANs (VLANS) in units of groups, and routers are used to transfer packets between the VLANs. In this case, as shown in FIG. 6, it suffices if each router has a memory table 23' in which the "VLAN ID" column and the "PORT NUMBER" column are arranged in place of the "INTERFACE" column, and the ID numbers of the VLANs and the port numbers which correspond to the respective IP addresses are registered in advance.

The packet whose MAC header portion has been updated by the second routing section 30 is sent to a terminal apparatus or another router through an interface section of the switching hub, together with the ID number of the corresponding VLAN and the port number.

In this case, if a terminal apparatus which has been connected to a given connection port is connected to another connection port, or the VLAN ID of the port is changed, the packet addressed to the terminal apparatus may be kept output to the previous connection port, or may be kept output together with the old VLAN ID.

To prevent this, the following operation may be performed. First of all, the number and VLAN ID of a connection port through which a packet is received are added to the head portion of the packet. The registration determination means 29 then obtains the connection port number and the VLAN ID which correspond to $SA_{IP}$ of the packet from the memory table 23'. If it is determined upon comparison that the obtained connection port number and the VLAN ID do not coincide with the connection number and the VLAN ID added by the interface, the data corresponding to $SA_{IP}$ are deleted from the memory table 23'.

When a terminal apparatus connected to a new connection port different from the previous one receives a packet through the new connection port, the first routing section 22 registers the respective pieces of information about the terminal apparatus in the memory table 23'. Similarly, when a new packet is received from a terminal apparatus connected to a connection port whose VLAN ID has been changed, the first routing section 22 registers the respective pieces of information about the terminal apparatus in the memory table 23'.

In the above embodiment, the second routing section 30 is specially designed to perform routing for a packet complying with the IP. Consider a router used in a network in which packets complying with a protocol other the IP, e.g., the IPX protocol, are frequently used. In this case, it suffices if the router has a means for determining the IPX protocol instead of the IP, and the second routing section is specially designed to perform routing for IPX packets.

In this case, the first routing section 22 must cope with at least IPX packets.

When the first routing section 22 is designed to cope with a plurality of protocols, e.g., the IP and AppleTalk (Macintosh), high-speed routing for packets satisfying the predetermined conditions based on the IP and AppleTalk may be realized by using the second and third routing sections specially designed for the respective protocols.

As has been described above, the router serving as the inter-LAN connection apparatus of the present invention includes the memory table in which the data link layer addresses corresponding to the optimal, nearest routes for the network layer destination addresses of packets are registered in advance, together with the pieces of information indicating the corresponding interfaces, and also includes the routing section specially designed to perform routing for a packet having network layer address registered in the memory table and satisfying the predetermined conditions. With this arrangement, routing for a packet satisfying the predetermined conditions and having data link layer destination address and interface information registered in the memory table can be performed at a very high speed without performing address masking, metric value determination, and the like as in the prior art. By setting conditions for packets which are used most frequently as the above predetermined conditions, the packet transmission efficiency in the communication network can be greatly improved, thereby coping with high-speed LANs.

According to the present invention, therefore, there is provided a router serving as an inter-LAN connection apparatus which can perform high-speed routing based on the assumption that most of the packets flowing in LANs satisfy predetermined conditions.

Additional embodiments of the present invention will be apparent to those skilled in the art from consideration of the specification and practice of the present invention disclosed herein. It is intended that the specifications and examples be considered as exemplary only, with the true scope of the present invention being indicated by the following claims.

We claim:

1. A router having a first routing section for performing routing based on a routing table and an ARP (address resolution protocol) table to transmit a received packet to a destination and adapted to connect a plurality of local area networks (LANs), comprising:

a memory table for storing a MAC (media access control) address and interface information obtained by processing an IP (Internet protocol) address of the destination of the received packet in said first routing section in association with the IP address of the destination; and a processor which obtains a MAC address and interface information corresponding to the IP address by using information in said memory table when the same IP address of the destination as the IP address of the destination stored. in said memory table is input after processing by said first routing section, wherein said processor comprises:

a registration determination section for checking whether the IP address of the destination of the received packet is stored in said memory table; and a second routing section for outputting the received packet based on the MAC address corresponding to the IP address by using information in said memory table, when said registration determination section determines that the IP address of the destination of the received packet is stored, and wherein said first routing section performs routing when the registration determination section determines that the IP address of the destination of the received packet is not stored.

2. A router according to claim 1, wherein when the IP address of the destination corresponds to a terminal apparatus in a LAN connected through another router, the MAC address is a MAC address of said another router.

3. A router according to claim 1, wherein said processor includes a packet determination section for checking whether the received packet satisfies predetermined conditions.

4. A router according to claim 1, wherein said second routing section updates the IP header and the MAC address corresponding to the IP address of the destination of the received packet, and outputs the packet to the destination when the MAC address and the interface information corresponding to the IP address are obtained by using information in said memory table.

5. A router according to claim 1, wherein said processor comprises:

a packet determination section for checking whether the received packet satisfies predetermined conditions;

and wherein said second routing section updates the IP header and the MAC address corresponding to the IP address of the destination of the received packet and outputs the packet to the destination on the basis of the determination results obtained by said packet determination section and said registration determination section when the MAC address and the interface information corresponding to the IP address are obtained by using information in said memory table.

6. A router according to claim 3, wherein said packet determination section is formed by hardware.

7. A router according to claim 1, wherein said registration determination section is formed by hardware.

8. A router according to claim 4, wherein said second routing section is formed by hardware.

9. A router according to claim 5, wherein said packet determination section, said registration determination section, and said second routing section are formed by hardware.

10. A router according to claim 1, wherein said processor comprises:

a packet determination section for checking whether the received packet satisfies predetermined conditions;

and wherein said first routing section performs the routing when said packet determination section determines that the packet does not satisfy the predetermined conditions, or said registration determination section determines that the IP address of the destination of the received packet is not stored in said memory table.

11. A router according to claim 10, wherein said first routing section includes means for storing the IP address of the destination. of the received packet and the corresponding MAC address and interface information in said memory table when routing is performed.

12. A router according to claim 1, further comprising means for updating stored contents of said memory table in accordance with a frequency of use.

13. A router according to claim 1, further comprising a plurality of interfaces for connection to said plurality of LANs so that a MAC address of a packet received through one of said interfaces to output the packet to a nearest LAN so as to transmit the packet to the LAN to which a terminal apparatus corresponding to a destination IP address of the packet belongs.

14. A router according to claim 13, wherein IP addresses of terminal apparatuses in LANs directly connected to said interfaces and IP addresses of terminal apparatuses in LANs connected to said router through other routers are stored in said memory table, together with MAC addresses of said terminal apparatuses in said LANs directly connected to said interfaces, which are stored in correspondence with the IP addresses, a MAC address of said other routers, which is stored in correspondence with the IP addresses of said terminal apparatuses in said LAN connected to said router through said other routers, and pieces of designation information for designating interfaces for directly transmitting packets to said terminal apparatuses having the stored MAC addresses and said other routers, which are stored in correspondence with the respective IP addresses.

15. A router according to claim 14, wherein said processor comprises:

packet determination means for comparing data of a header portion of the received packet with corresponding predetermined values to check whether the received packet satisfies the predetermined conditions;

and wherein said second routing section reads out a MAC address corresponding to the destination address and corresponding interface designation information from said memory table when said packet determination means determines that the received packet. satisfies the predetermined conditions, and said registration determination means determines that the destination IP address is registered in said memory table, updates the MAC address of the received packet with the readout MAC address and the MAC address of said router, and outputs the packet from said interface designated by the designation information.

* * * * *